Patented Oct. 10, 1950

2,525,200

UNITED STATES PATENT OFFICE 2,525,200

PROCESS FOR PREPARING 2-MERCAPTO OXAZOLINES

Ernst Bergmann, London, England, assignor to Polymerisable Products Limited, London County, England, a British company No Drawing. Application December 23, 1946, Serial No. 718,107

5 Claims. (Cl. 260—307)

The present invention has reference to new heterocyclic mercaptans. It covers, in particular, new heterocyclic mercaptans of the oxazoline series of the general formula

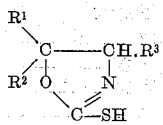

in which $R^1$, $R^2$ and $R^3$ are monovalent hydrocarbon radicals and in which $R^1$ and $R^2$ are either separate or can form together a hydroaromatic ring system. The invention further embraces the process of making such substances.

The present invention consists especially in such oxazoline derivatives in which $R^3$ is methyl. It consists in new mercaptans useful as rubber chemicals and as raw material for syntheses in the pharmaceutical field, in the field of rodenticides and fungicides and in the manufacture of dye-stuffs.

The surprising observation has been made that amino tertiary alcohols with primary aminogroups of the general formula

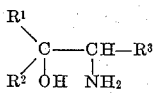

react with carbon disulphide or thiophosgene so violently that dilution of the material before treatment is usually (or often) advisable. Preferable diluents are alcohols from which the products often crystallise in pure form. One would not expect that the tertiary hydroxyl group in such amino alcohols would participate in the reaction as its reactivity would be expected to be very much lower than that of the neighboring primary amino group. It has, however, been found that all substances which contain the above formulated system react easily and in very satisfactory yields to form the mercapto-oxazolines. These substances can be oxidised to the corresponding disulphides and further to sulphonic acids. They can also be alkylated in the —SH group to give the corresponding alkylthio-oxazolines.

Examples

[All parts are given by weight]

*Example 1.*—3-methyl-2-amino-3-butanol and carbon disulphide. 51 parts of the amino-alcohol were slowly added, with cooling, to 38 parts carbon disulphide. The reaction, which was accompanied by evolution of hydrogen sulphide, was very violent and led to the formation of a solid. The solid reaction product was, therefore, diluted with 80 parts alcohol and the mixture boiled for 1 hour, so as to ensure completion of reaction. 40 parts alcohol were distilled off, the product refrigerated, and the crystalline cake, obtained at 0° C., was filtered and recrystallised from alcohol. M. P. 122°, 2-mercapto-4,5,5-trimethyl-1-oxazoline.

*Analysis.*—Calc. for $C_6H_{11}ONS$: N, 9.7. Found: N, 10.0.

*Example 2.*—3-ethyl-2-amino-3-butanol and carbon disulphide. To 21 parts of the amino-alcohol in 80 parts alcohol, 19 parts carbon disulphide were added. After standing at room temperature for 1 hour, the mixture was boiled for 1 hour and the solvent removed by evaporation. The oily residue was distilled under 60 mm. pressure. Much resin remained, the product boiling at 118–121°. The main product was 2-mercapto-4,5-dimethyl-5-ethyl-1-oxazoline; density, 0.945; refractive index, 1.4445. This is a liquid.

It has been stated above that $R^1$ and $R^2$ can be hydrocarbon radicals, or the group

can form a hydroaromatic ring. As a suitable amino alcohol in which $R^1$ is aryl, I would mention 3-phenyl-2-amino-3-butanol, and as an example of an alcohol in which the hydroaromatic ring exists, I would mention 1-(α-amino-ethyl) cyclohexanol. These could be substituted in the above examples instead of the amino alcohol there given, both giving solid products.

*Example 3.*—3-methyl-2-amino-3-butanol and thiophosgene. 51 parts of the amino alcohol were diluted with the same quantity of benzene. At a temperature of 0° 58 parts thiophosgene were slowly added while keeping the reaction mixture at about 0° to 40° C. The reaction product crystallized spontaneously, it was filtered off and recrystallized from alcohol. M. P. 122°; yield, almost quantitative.

The term "aminotertiary alcohol" has been used herein to designate the alcohols treated. These are tertiary alcohols containing a primary amino group attached to a carbon atom adjacent to the carbinol group.

I claim:

1. A process which comprises treating an alcohol of the type

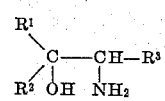

in which $R^1$, $R^2$ and $R^3$ are monovalent hydrocarbon radicals, with a substance selected from the group consisting of carbon bisulphide and thiophosgene, without adding any caustic alkali thereto and without heating the reaction mixture.

2. A process as covered in claim 1 in which $R^1$, $R^2$ and $R^3$ are all methyl.

3. A process which comprises treating an alcohol of the type

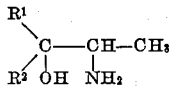

in which $R^1$ and $R^2$ are monovalent hydrocarbon radicals, with a substance selected from the group consisting of carbon bisulphide and thiophosgene, while in the presence of an inert diluent which is a solvent for the reaction product, and while in the absence of caustic alkali.

4. A process which comprises treating an alcohol having the structure

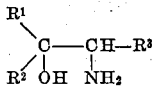

in which $R^1$ and $R^2$ and $R^3$ are monovalent hydrocarbon radicals, with carbon bisulphide in the presence of an inert diluent which is a solvent for the reaction product, and in the absence of caustic alkali, and without applying extraneous heat to the reaction mass.

5. A process which comprises treating an alcohol having the structure

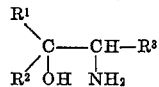

in which $R^1$ and $R^2$ and $R^3$ are monovalent hydrocarbon radicals, with thiophosgene in the presence of an inert diluent which is a solvent for the reaction product, in the absence of caustic alkali, and without applying extraneous heat to the reaction mass.

ERNST BERGMANN.

REFERENCES CITED

The following references are of record in the file of this patent:

UNITED STATES PATENTS

| Number | Name | Date |
|---|---|---|
| 1,610,216 | Elley | Dec. 7, 1926 |
| 1,681,717 | Whitby | Aug. 21, 1928 |
| 2,283,747 | Mathes | May 19, 1942 |
| 2,414,066 | Scott | Jan. 7, 1947 |

OTHER REFERENCES

J. A. C. S., vol. 59, October 1937, pages 2011–2013.